United States Patent [19]
Webster et al.

[11] Patent Number: 5,170,035
[45] Date of Patent: Dec. 8, 1992

[54] SENSOR CIRCUIT FOR CONTROLLING CURRENT FLOW IN AN INSTRUMENT LOOP

[76] Inventors: Lee R. Webster, 7 Shoreview Cir., Indialantic, Fla. 32903; Robert H. Richardson, Rte. #1, Box 12A, Hayesville, N.C. 28904

[21] Appl. No.: 619,235

[22] Filed: Nov. 28, 1990

[51] Int. Cl.$^5$ .......................... G05F 1/56; H01J 40/14
[52] U.S. Cl. .............................. 250/214 R; 250/214 A
[58] Field of Search ........ 250/214 R, 214 A, 214 AL, 250/214 D, 214 L; 315/156, 157, 158, 159

[56] References Cited

U.S. PATENT DOCUMENTS

| | | | |
|---|---|---|---|
| Re. 33,205 | 4/1990 | Blake | 250/214 AL |
| 3,709,615 | 1/1973 | Blakeslee et al. | 356/224 |
| 3,976,875 | 8/1976 | Engstrom et al. | 250/226 |
| 4,135,116 | 1/1979 | Smith | 315/156 |
| 4,538,063 | 8/1985 | Bulat | 250/214 R |
| 4,656,353 | 4/1987 | Thompson | 250/227.14 |
| 4,742,574 | 5/1988 | Smith et al. | 250/214 A |
| 4,926,340 | 5/1990 | Goetzinger et al. | 364/483 |

Primary Examiner—David C. Nelms
Assistant Examiner—John R. Lee
Attorney, Agent, or Firm—Michael V. Drew

[57] ABSTRACT

A circuit for controlling current flow in an instrumentation loop includes a light sensor receiving impinging light and delivering a signal varying with the intensity of the impinging light. The signal is amplified and produces a reference signal which is a current signal of about four milliamperes in the absence of incoming light and about twenty milliamperes in maximum light. A voltage controlled current driver presents an impedance to current flow through the loop which varies with the reference signal and with the intensity of the incoming light. The sensor includes a mounting plate, a photodetector mounted on the mounting plate, a filter mounted over the photodetector, and a diffuser mounted on the mounting plate forming a dome over the filter and photodetector. The diffuser disperses incoming light before the incoming light impinges the photodetector. The filter blocks infrared light thereby blue enchancing impinging light to approximate the light sensitivity response of a human eye. The sensor circuit uses a photovoltaic cell and an amplifier to obtain an output that is linearly proportional to the light level.

3 Claims, 1 Drawing Sheet

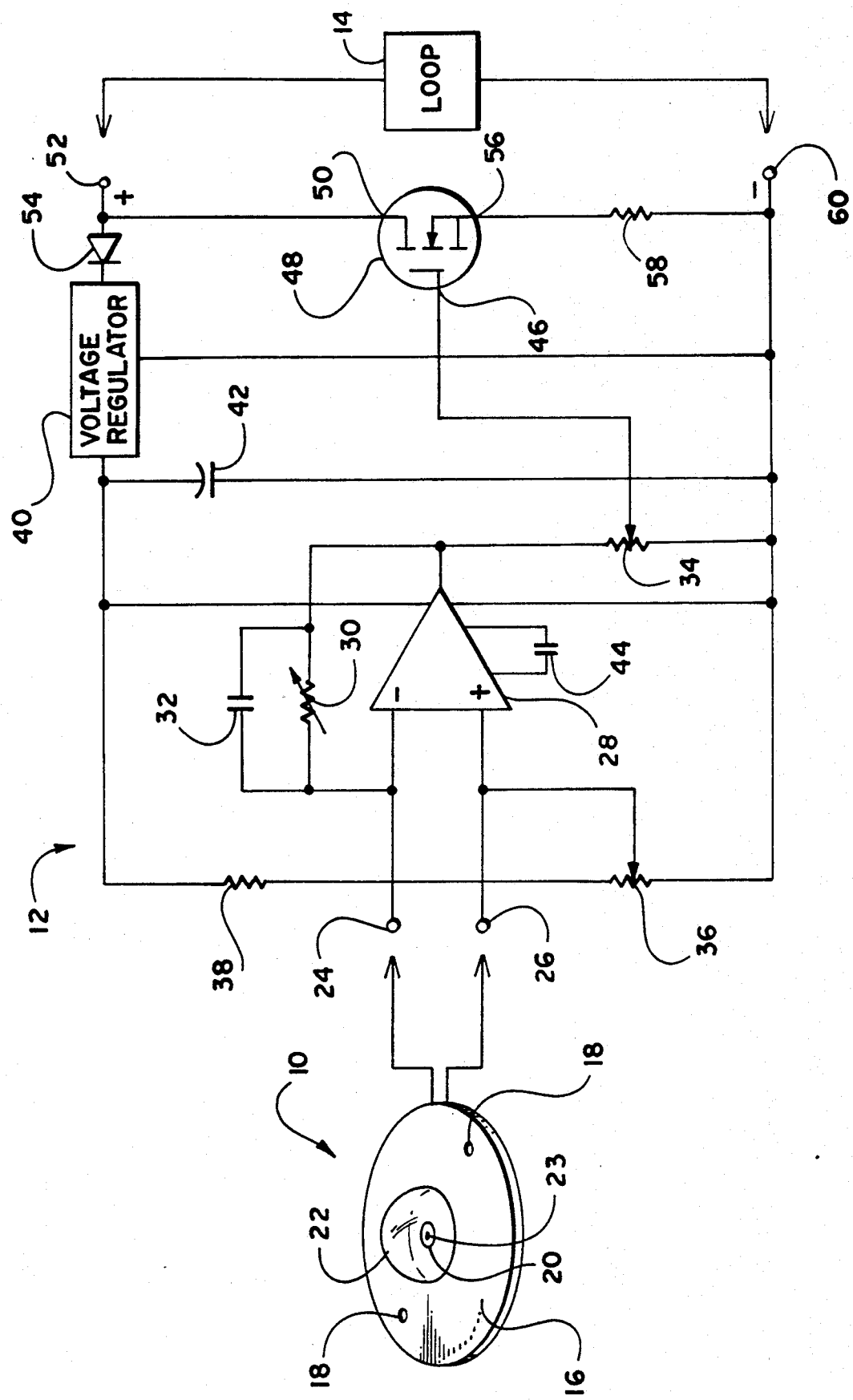

SENSOR CIRCUIT FOR CONTROLLING CURRENT FLOW IN AN INSTRUMENT LOOP

TECHNICAL FIELD

This invention generally relates to lighting, and, more particularly to a sensor for a lighting energy management control system wherein the sensor detects the level of light which information is used to control the intensity of the lighting for efficient energy use.

BACKGROUND OF THE INVENTION

Modern office buildings, schools, hospitals, retail and commercial establishments depend greatly upon indoor lighting for the efficient conduct of business and other operations. The intensity of the lighting required varies with the particular activity performed in the building. Retail workers require one level of lighting while office workers who do a considerable amount of reading will require a different level of lighting. In the past not a great deal of attention was given to lighting. It was thought sufficient if there was adequate lighting; that is, enough light to get the job done. Unfortunately, this practice led to having more light than was necessary or desired for some of the tasks being performed. In times past this waste of light was not deemed important; however, in the present age of energy conservation, lighting is very important and it is desirable to not waste energy on excessive lighting.

Energy management systems have been developed to assist in efficient utilization of lighting. Ideally, these systems would operate by scientifically establishing lighting needs in foot candles and monitoring the intensity of light in a given area so that the desired number of foot candles of light is available. Thus, on a bright or sunny day, less energy needs to be used for lighting than on a dark or cloudy day. These energy management systems would use some sort of sensor to detect the intensity of light in an area and use that information to apply more or less energy to the lighting or portions thereof. While the energy management control system concept seems simple and straight forward, it does have problems. As a result of these problems, present energy management systems only control lighting as an ancillary function. Their primary function is to control the operation of the HVAC system, and serve only as a time clock control for the lighting; namely, turning the lights on at the start of the day and turning the lights off at the end of the day.

One problem is that most sensors use a photoelectric cell for a light sensor, but these photoelectric cells are nonlinear devices without repeatable outputs and tend to be unreliable. They also suffer degradation with time making them unsuitable where the lighting level is critical, and they are sensitive to temperature variations. They may also have significant hysteresis and are only moderately effective in distinguishing between day and night. These characteristics make them unsuitable for control of office lighting to within a few foot candles. Accordingly, it will be appreciated that it would be highly desirable to have a sensor that is highly reliable, gives repeatable outputs, gives a linear output and is not sensitive to temperature variations.

Another problem with photoelectric cell sensors is that their sensitivity is different than the sensitivity of a human eye. Photoelectric sensors respond to light, both visible and infrared, while the human eye only responds to a spectrum of frequencies which are higher than infrared. It is therefore desirable to have a detector with the same sensitivity as the human eye. It is also desirable to have a sensor that gives a linear output so that adjustments in the lighting level can be made in the least distracting or least annoying manner.

Some sensors have been made using photovoltaic cells as photodiodes, but when used as such the output is not linearly proportional to the light level. Accordingly, it will be appreciated that it would be highly desirable to have a sensor using a photovoltaic cell to obtain an output that is linearly proportional to the light level.

SUMMARY OF THE INVENTION

The present invention is directed to overcoming one or more of the problems set forth above. Briefly summarized, according to one aspect of the present invention, a circuit controls current flow in an instrumentation loop having a varying dc voltage. The circuit includes a light sensor receiving impinging light and delivering a signal varying linearly with the intensity of the impinging light. The signal is amplified and produces a reference signal which is a current signal of about four milliamperes in the absence of incoming light. A voltage controlled current driver presents an impedance to current flow through the loop which varies with the reference signal and with the intensity of the incoming light.

An object of the invention is to provide a circuit for controlling current flow in an instrumentation loop having a varying voltage. It is a feature of the present invention that this object is achieved by a voltage controlled current driver which presents a varying impedance to current flow through the loop. An advantage of the current driver is that the impedance varies linearly with the intensity of incoming light impinging upon a detector.

Another object of the invention is to provide a sensor that uses a photovoltaic cell whose output is linearly proportional to the light level. The sensor includes a mounting plate, a photodetector mounted on the mounting plate, a filter mounted over the photodetector, and a diffuser mounted on the mounting plate forming a dome over the filter and photodetector. The diffuser disperses incoming light before the incoming light impinges the photodetector. The filter blocks infrared light thereby blue enhancing impinging light to approximate the light sensitivity response of a human eye. The sensor circuit uses a photovoltaic cell and an amplifier to obtain an output that is linearly proportional to the light level.

Another object of the invention is to provide a sensor that is highly reliable, gives repeatable outputs, and is not sensitive to temperature variations.

These and other aspects, objects, features and advantages of the present invention will be more clearly understood and appreciated from a review of the following detailed description of the preferred embodiments and appended claims, and by reference to the accompanying drawing.

BRIEF DESCRIPTION OF THE DRAWING

The drawing is a schematic diagram of a preferred embodiment of a sensor circuit for controlling current flow in an instrumentation loop according to the present invention.

DETAILED DESCRIPTION OF THE PREFERRED EMBODIMENTS

Referring to the drawing, an apparatus is illustrated that includes a sensor 10 and an electronic circuit 12 for processing information received from the sensor 10. The circuit or transmitter 12 controls current flow in an instrumentation loop 14. The loop 14 preferably is part of an energy management control system such as that used to control the energy distribution in a building. The energy management control system electrical circuits called loops operate with a standard carrier current of about four to twenty milliamperes which is monitored by the energy management control system computer. When the carrier current is four milliamperes, the computer will increase energy to the lighting system, and when the carrier current is about twenty milliamperes, the computer will decrease energy to lighting system. Thus, the energy demand varies inversely with the loop current, and the loop current varies with the detected light.

The light sensor 10 includes a mounting plate 16 with mounting holes 18 and a photodetector 20 mounted on the mounting plate 16. A diffuser 22 is also mounted on the mounting plate 16 forming a dome over the photodetector 20 to diffuse incoming light before the incoming light impinges on the photodetector 20. A filter 23 is mounted over the photodetector 20 within the domed diffuser 22. The filter 23 blue enhances the incoming light to approximate the light sensitivity response of a human eye. By this construction the photodetector 20 only sees the visible light as the human eye does.

The photodetector 20 is a photovoltaic cell that generates a small current in response to the incoming light impinging on the photovoltaic element. One such photovoltaic element is a photodiode which responds to both visible light and infrared light. By blue filtering the incoming light with filter 23 the light impinging upon the photodiode 20 is the spectrum visible to the human eye.

The electronic circuit 12 receives an output signal from the sensor 10 at terminals 24 and 26. Terminal 24 is connected to the inverting input of operational amplifier 28, and to one end of a feedback resistor 30 and capacitor 32. The other ends of the feedback resistor 30 and capacitor 32 are connected to the output of the amplifier 28, and to one end of a resistor 34 whose other end is connected to the negative supply voltage. The resistor 34 is preferable a potentiometer, and resistor 30 is preferably adjustable.

Terminal 26 is connected to the noninverting input of amplifier 28, and preferably to the wiper of a potentiometer 36. The resistor 36, along with a fixed resistor 38 form a voltage divider with resistor 38 connected to the positive supply voltage from the voltage regulator 40 and the resistor 36 connected to the negative supply voltage. Alternatively, resistor 36 could be a fixed or adjustable resistor with one end connected to resistor 38, terminal 26 and the noninverting input of the amplifier 28, and the other end connected to the negative supply voltage. Filter capacitor 42 is connected across the positive and negative outputs of the voltage regulator 40. The BI-FET operational amplifier 28 buffers and amplifies the incoming signal from the sensor 10. A capacitor 44 is attached to the amplifier 28 for frequency compensation.

The wiper of the potentiometer 34 is connected to the gate input 46 of field effect transistor 48. The drain input 50 of the MOSFET 48 is connected to terminal 52. Terminal 52 is also connected to the anode of diode 54 which has its cathode connected to the voltage regulator 40. One portion of the loop 14 is also connected to the terminal 52. The source input 56 of the transistor 48 is connected to one end of a resistor 58 which has its other end connected to negative terminal 60. The loop 14 is also connected to the negative terminal 60.

Isolation from the sensor 10 to the loop 14 is extremely high. The input impedance to the transmitter module 12 is the input impedance of the BI-FET operational amplifier 28 which is in excess of $10^{12}$ ohms. The output device 48 is an N-channel MOSFET transistor with an input to output impedance also in excess of $10^{12}$ ohms. An output impedance on the order of a thousand ohms sufficient to isolate the loop 14 from the circuit or transmitter 12 should a fault occur.

The voltage regulator 40 transforms the varying direct current voltage from the loop 14 to an isolated and steady five volts direct current for use in the circuit 12.

While operation of the present invention is believed to be apparent from the foregoing description, a few words will be added for emphasis. The small output from the sensor 10 is buffered and amplified by the amplifier 28 which has its gain controlled by feedback resistor 30. The voltage at the inverting input to the amplifier 28 is the algebraic sum of the sensor output voltage and an adjustable bias set by the wiper of resistor 36. This bias adjustment is used to set the output to be four milliamperes with zero light input. The gain of the amplifier 28 is set by adjusting resistor 30 to give twenty milliamperes loop current with the maximum desired light input. The voltage controlled current driver 48 acts as a variable impedance to control the loop current in proportion to the voltage (light level) input. The gain of the system can be configured for ranges of zero to two thousand foot candles or more. The loop resistance can be anywhere from less than one hundred ohms to approximately one thousand ohms with a twenty-four volt loop source.

While the invention has been described with particular reference to the preferred embodiment, it will be understood by those skilled in the art that various changes may be made and equivalents may be substituted for elements of the preferred embodiments without departing from invention. In addition, many modifications may be made to adapt a particular situation and material to a teaching of the invention without departing from the essential teachings of the present invention.

It will be now appreciated that there has been presented a circuit for controlling current flow in an instrumentation loop. The circuit includes a light sensor receiving impinging light and delivering a signal varying with the intensity of the impinging light. The signal is amplified producing a reference signal which is a current signal of about four milliamperes in the absence of incoming light and about twenty milliamperes in maximum light. A voltage controlled current driver presents an impedance to current flow through the loop which varies with the reference signal and with the intensity of the incoming light.

The sensor includes a mounting plate, a photodetector mounted on the mounting plate, a filter mounted over the photodetector, and a diffuser mounted on the mounting plate forming a dome over the photodetector. Incoming light is filtered before impinging upon the photodetector. The filter blue enhances impinging light to approximate the light sensitivity response of a human eye. The photodetector uses a photovoltaic cell to obtain an output that is linearly proportional to the light level. The sensor is highly reliable, gives repeatable outputs, and is not sensitive to temperature variations.

As is evident from the foregoing description, certain aspects of the invention are not limited to the particular details of the examples illustrated, and it is therefore contemplated that other modifications and applications will occur to those skilled the art. It is accordingly intended that the claims shall cover all such modifications and applications as do not depart from the true spirit and scope of the invention.

We claim:

1. A circuit for controlling current flow in an instrumentation loop having a varying dc voltage, comprising:

a light sensor for receiving impinging light and delivering a signal varying with the intensity of said impinging light;

means for amplifying said varying signal and delivering a linear reference signal; and MOSFET means for receiving said linear reference signal, delivering a current signal varying with the intensity of said impinging light, and presenting an impedance to current flow through said loop.

2. The invention of claim 1, said linear reference signal being a current signal of about four milliamperes in the absence of impinging light.

3. The invention of claim 1, said impedance varying with said linear reference signal and the intensity of said impinging light.

* * * * *